United States Patent [19]

Focke et al.

[11] Patent Number: 4,907,689
[45] Date of Patent: Mar. 13, 1990

[54] APPARATUS FOR TRANSPORTING REELS OF PACKAGING MATERIAL IN A PACKAGING MACHINE PLANT

[75] Inventors: Heinz Focke; Kurt Liedtke, both of Verden, Fed. Rep. of Germany

[73] Assignee: Focke & Co., (GmbH & Co.), Verden, Fed. Rep. of Germany

[21] Appl. No.: 99,964

[22] Filed: Sep. 23, 1987

[30] Foreign Application Priority Data

Sep. 23, 1986 [DE] Fed. Rep. of Germany ....... 3632237

[51] Int. Cl.$^4$ .............................................. B65G 17/48
[52] U.S. Cl. ............................... 198/487.1; 198/643.2; 198/465.4; 198/486.1; 198/680; 198/687; 198/803.12
[58] Field of Search ............... 198/463.2, 463.3, 465.4, 198/485.1, 486.1, 487.1, 680, 687, 803.12

[56] References Cited

U.S. PATENT DOCUMENTS

| | | | |
|---|---|---|---|
| 2,813,643 | 11/1957 | Prentice | 198/463.3 X |
| 3,033,342 | 5/1962 | Kinnicutt, Jr. | 198/486.1 X |
| 3,171,536 | 3/1965 | Johnson | 198/465.4 |
| 3,575,282 | 4/1971 | Gaiotto et al. | 198/683 |
| 3,589,503 | 6/1971 | Leach | 198/683 |
| 4,565,278 | 1/1986 | Asai et al. | 198/400 |
| 4,763,773 | 8/1988 | Kawarabashi et al. | 198/463.3 X |

FOREIGN PATENT DOCUMENTS

| | | | |
|---|---|---|---|
| 3630537 | 3/1987 | Fed. Rep. of Germany | 198/487.1 |
| 0580148 | 11/1977 | U.S.S.R. | 198/485.1 |
| 688395 | 9/1979 | U.S.S.R. | 198/486.1 |
| 700396 | 12/1979 | U.S.S.R. | 198/486.1 |
| 1298158 | 3/1987 | U.S.S.R. | 198/486.1 |

Primary Examiner—Robert J. Spar
Assistant Examiner—Lyle Kimms
Attorney, Agent, or Firm—Sughrue, Mion, Zinn, Macpeak & Seas

[57] ABSTRACT

For supplying sheet-like material to packaging machines and other processing machines, a rotating circular conveyor (32) is installed within a production or packaging plant. Reel carriers (34) rotate continuously in its conveying rail (33). Reels are automatically picked up in the region of a loading station (36, 36a, etc) and, after rotation about a vertical axis, are automatically taken off from the reel carrier at an unloading station (71) by being stripped off.

23 Claims, 13 Drawing Sheets

APPARATUS FOR TRANSPORTING REELS OF PACKAGING MATERIAL IN A PACKAGING MACHINE PLANT

BACKGROUND OF THE INVENTION

Apparatus for transporting articles, especially rolls (reels) of packaging material, from a stock to at least one take-off station, especially to a plurality of packaging or other processing machines of a (cigarette) production and/or packaging plant.

Highly efficient cigarette factories are equipped with several mutually coordinated and interacting cigarette production and packaging machines—so-called lines. A line of this type conventionally consists of a cigarette production machine (extrusion machine), a filter-attaching machine (if appropriate) and packaging machines for the packaging of cigarette groups into packs consisting of several blanks of differing packaging material. The packaging zone of a line conventionally comprises a tin foil packaging machine, a paper packaging machine and a polypackaging machine.

The abovementioned packaging and suchlike processing machines must be supplied with material, in particular primarily packaging material, but also so-called coating paper for producing the (double) filters in the region of the filter-attaching machine. Because of the high output of these production and packaging machines, there is a constant need for a substantial amount of packaging material which is delivered to the processing machines in the form of rolls (reels). The packaging machines are equipped with reel-changing devices, on each of which an "active" running-off reel and a stock reel are provided.

SUMMARY OF THE INVENTION

The object on which the invention is based is to supply processing machines, especially packaging machines for sheet-like material (packaging material), to a sufficient extent with reels of the material to be processed, in a largely automated way and without the involvement of attendance, specifically especially on large-scale plants consisting of several lines.

To achieve this object, the apparatus according to the invention is characterized by at least one circular conveyor running above the processing machines and having a plurality of article carriers, especially reel carriers, each for receiving at least one article or one reel and for transferring this to a processing machine.

Consequently, according to the invention, the reels are transported by a circular conveyor which is mounted inside the production building above the processing machines, conventionally below the ceiling of the building. The circular conveyor consists of an endless running rail, in which a plurality of reel carriers rotate at a distance from one another. The reel carriers are designed so that, as required, a reel is picked up in the region of a pick-up station and is discharged in the region of a discharge station, in particular adjacent to or above the processing machine.

In the preferred embodiment of the invention, the reel carrier is designed and actuated in such a way that the reels appropriately provided in the loading stations are picked up automatically during or as a result of the conveying movement of the reel carriers. Furthermore, in the region of a discharge station, the reels are taken off from the reel carrier likewise automatically and delivered to the processing machine or to a reel-changing device of the latter.

According to a further proposal of the invention, several loading stations, each for reels of a different dimension (width), are assigned to the circular conveyor. In this case, the reel carriers are also each designed, especially dimensioned, for a specific type of reel. The reels are appropriately supplied in the region of the loading station on pallets. Each loading station is equipped with a separate elevator for the reels. By means of this, the reels enter the actual loading station level with the path of movement of the rotating reel carriers. Each reel is supplied in a plane transverse relative to the conveying direction, so that a supporting member of the reel carrier, especially a supporting journal, can enter a (central) reel orifice as a result of the movement. During further transport, the reel carrier is rotated about a vertical axis, so that the supporting journal, pointing forwards in the conveying direction when a reel is picked up, is directed rearwards. It is thereby possible for the reel to be stripped off from the supporting journal in the region of the discharge station by means of stops fixed in place.

In the discharge station, the reels are received by an intermediate conveyor which delivers the reels automatically to the reel-changing device of the processing machine.

According to an alternative version of the invention, the reel carriers are designed so that their supporting journals are axially displaceable. As a result, the reel can be picked up in the loading station as a result of an axial shift of the supporting journal (into the reel orifice) and taken off from the reel carrier corrspondingly in the region of the discharge station.

According to a further alternative, the supporting journal of the reel carrier or a guide of the latter can be arranged on an undercarriage of the reel carrier, for example on a vertical supporting rod, so as to be movable up and down.

Further features of the invention relate to the design of the reel carrier, circular conveyor, loading stations and reel-changing device.

Exemplary embodiments of the invention are explained in detail below with reference to the drawings. In these:

DETAILED DESCRIPTION OF PREFERRED EMBODIMENTS

Figure 1:
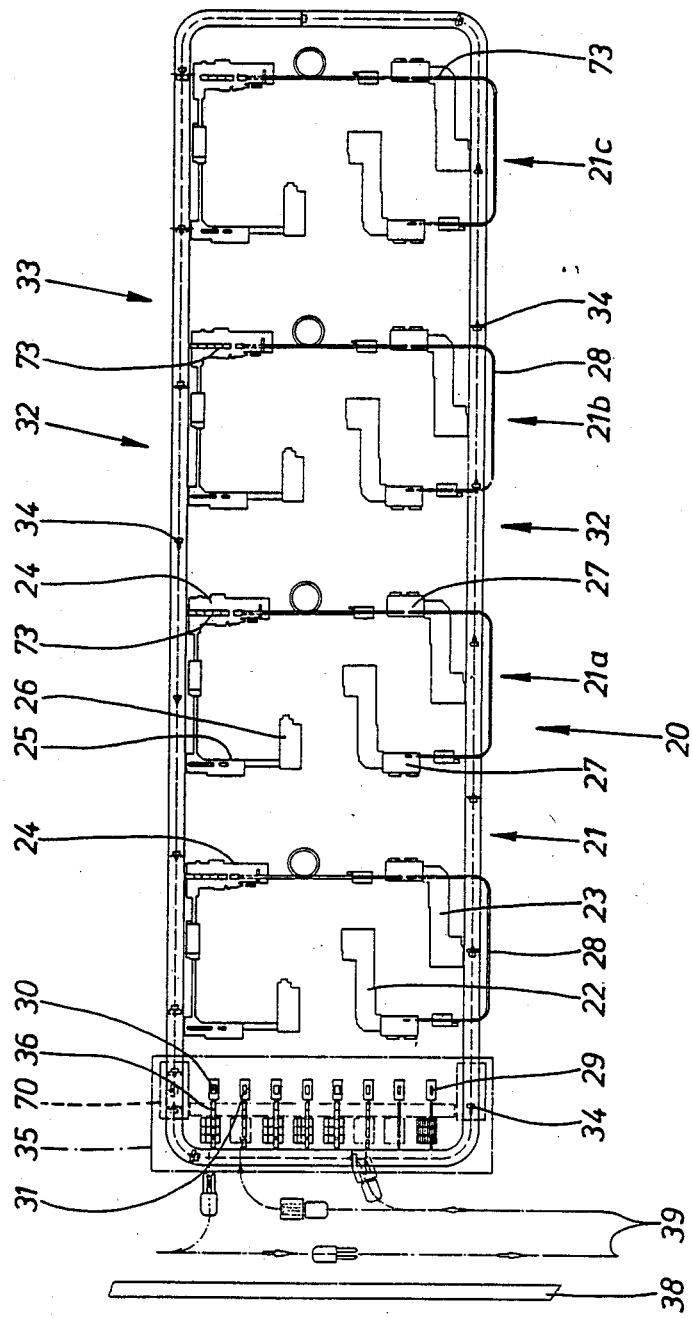
FIG. 1 shows a diagrammatic horizontal projection of a (cigarette) production and packaging plant.
Figure 2:
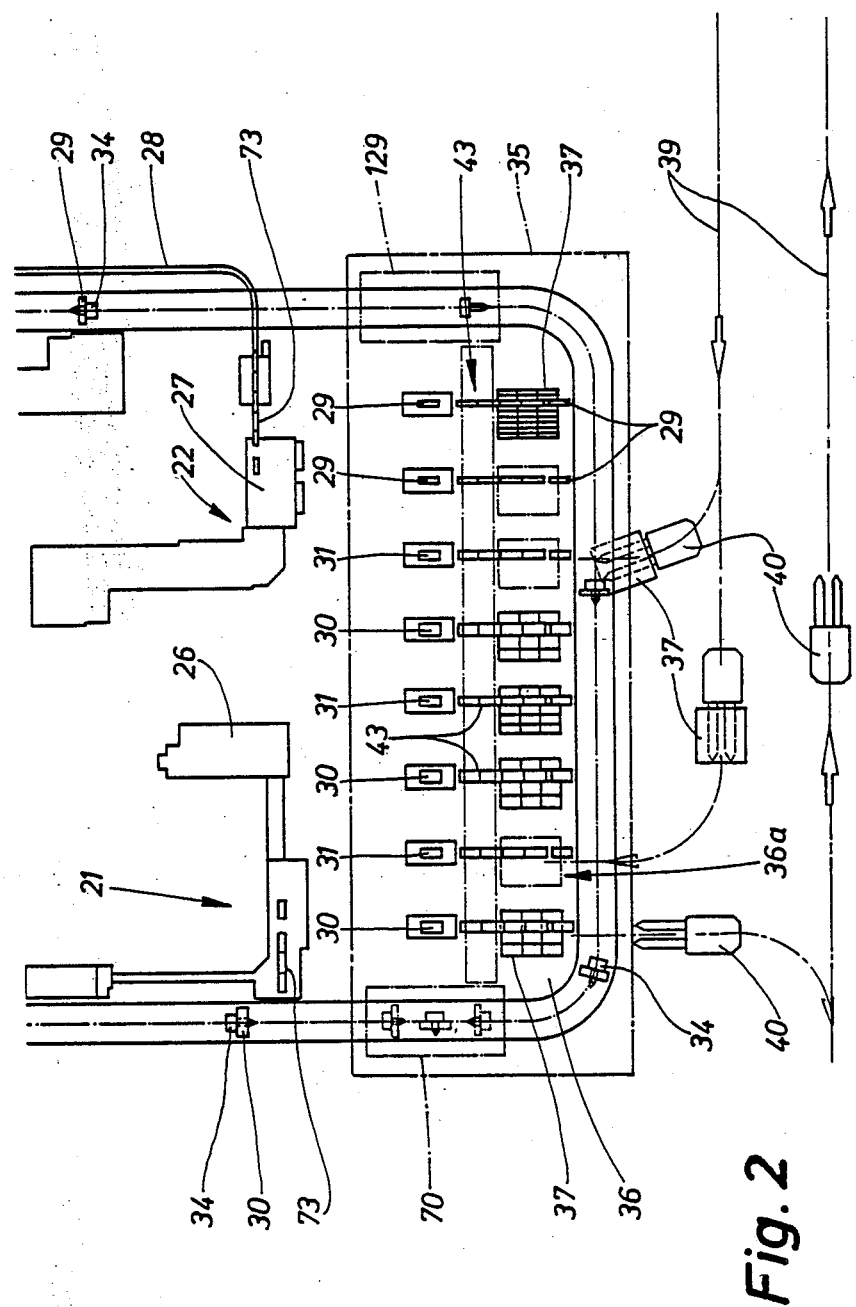
FIG. 2 shows a part region of the plant according to FIG. 1 on an enlarged scale, likewise in a horizontal projection.

The exemplary embodiments illustrated and described below relate to the cigarette production and packaging zone. Cigarette production and packaging machines are accommodated in an elongate rectangular production building 20 in units coordinated with one another in functional terms—so-called lines 21. In the present case, each line 21 consists of two extrusion machines, 22, 23, (cigarette production machines), a cigarette packaging machine 24, especially a hinge-lid packer, a film-wrapping machine 25 and a stick packer 26. The latter serves for producing bundles of several cigarette packs. The extrusion machines 22, 23 are equipped with filter-attaching machines 27, in the region of which a (double-length) cigarette filter is provided with coating paper. The machines and units described are connected to one another by means of a pack conveyor track 28. In the exemplary embodiment illustrated, four lines 21, 21a, etc are accommodated inside the production building 20.

As described, each line 21, 21a, etc contains several processing machines for sheet-like material, especially packaging material. The coating paper is processed in the region of the extrusion machines 22, 23. The cigarette packaging machine 24 processes tin foil and paper or cardboard as packaging material. In the region of the film-wrapping machine 25, film material (polyfilms) is processed, whilst the stick packer 26 has to be supplied with paper. The abovementioned materials are delivered in the form of reels. Since, in the present example, the cigarette packaging machine uses individual blanks prepared for the production of hinge-lid packs, as does the stock packer 26, three different types and dimensions of reels occur here, namely paper reels 29 for the filter-attaching machines 27, tin foil reels 30 for the cigarette packaging machines 24 and poly-reels 31 for the film-wrapping machines 25.

For transporting the reels 29, 30, 31, a closed circular conveyor 32 is installed in the production building 20 and runs along the edge of the latter. This is located above the processing machines (lines 21, etc), especially below the ceiling of the building. The circular conveyor 32 consists of an approximately rectangularly guided closed conveying rail 33 and of a plurality of supporting members, namely reel carries 34, running in this. Each of these serves for picking up a reel 29, 30, 31.

In the present example, the circular conveyor 32 is equipped with 18 reel carriers 34 alogether, specifically of different shape or dimensions respectively matching the dimensions of the types of reel to be conveyed. The reel carriers 34 rotate continuously, whilst maintaining the same distances from one another, and as required reels 29, 30, 31 are extracted in the region of the processing machines or picked up in the region of a loading station.

The reel carriers 34 are loaded in the region of a central loading zone 35. Here, this is formed at one end of the production building 20 in the region of a short transverse portion of the circular conveyor 32. For each type of reel (several) separate loading stations 36, 36a, 36b, etc are formed.

In the present case, the reels 29, 30, 31 are delivered to the particular loading station 36, 36a, etc on pallets 37. For this purpose, carriageways 39 for fork-lift trucks 40 are provided in front of the loading zone 35 along one wall 38 of the building. Each of these fork-lift trucks 40 transports a pallet 37 loaded with reels 29, 30, 31 to one of the loading stations 36, 36a, 36b, etc.

In the loading station 36, 36a, etc, the loaded pallets 37 are position at a predetermined point, specifically in a particular relative position in relation to an elevator 41 for the reels. The arrangement is such that a gap functioning as an operator access way 42 remains free between the pallets 37 on the one hand and a lower feed end of the elevator 41. An attendant can work here, and the reels stacked on the pallet 37 in a vertical plane can be introduced into the elevator 41 manually.

The elevator 41 transports the reels 29, 30, 31 up to the level of the circular conveyor 32. In the present exemplary embodiment, approximately in the plane of the circular conveyor 32 there is an intermediate conveyor 43 which is adjacent to the elevator 41 and which feeds the reels 29 to 31 to a take-over point 44 in the position transverse relative to the direction of transport of the circular conveyor 32. Here, the intermediate conveyor 43 is designed as a sloping conveying track 45 which descends to the take-over point 44 and on which the reels 29 to 31 roll under their own weight to the take-over point 44. Attached in front of this is a stop 46 which is displaceable in the direction of movement and which fixes the reels 29 to 31 in front of the take-over point 44 and releases a reel or is moved together with the latter to the take-over point 44 only when an arriving reel carrier 34 has to pick up a reel 29 to 31 from this loading station 36, 36a, etc. At the same time, the stop positions the reel to be picked up exactly in the path of movement of the reel carrier 34. The intermediate conveyor 43 serves, for each loading station 36, 36a, etc, as an intermediate store for receiving a number of reels 29 to 31.

The elevator 41 can be designed in various ways, in the present exemplary embodiment, a rod conveyor 47 is used, its conveying rods 48 respectively grasping the reels 29 to 31 off-centre at the bottom on their periphery. The conveying rods 48 are arranged at relatively long distances from one another and are driven by an endless chain 49.

In the region of the elevator 41, the reels, in the relative position (aligned in a vertical plane) necessary for the pick-up by the reel carrier 34, are transported between lateral guides. In the present case, these consist of vertical bands 50, 51. These run idly and are driven along by means of the upwardly conveyed reels 29 to 31 via the respective inner strand. This prevents friction of the reels 29 to 31 on lateral guides.

In the region of transition from the elevator 41 to the intermediate conveyor 43, there is an arcuate baffle wall 52 which ensures the movement for conveying the reels onto the intermediate conveyor 43.

The reels 29 to 31 are taken over by the reel carriers 34 in the region of respective loading stations 36, 36a, 36b, etc in a special way. For this purpose, each reel carrier is equipped with a transversely or horizontally directed supporting journal 53 which is moved into a conventionally provided central orifice 54 in the reel and which thus picks up the reel. The central orifice 54 is formed by a cylindrical hollow core 55, conventionally made of cardboard, in each of the reels 29 to 31. The supporting journal 53 fits into this central orifice 54.

The supporting journal 53 is arranged on a supporting arm 56 angular in the present case and belonging to the reel carrier 34 or on a vertical leg 57 of the latter. A transverse leg 58 adjoining this is connected to the under-carriage 59 of a bogie 60. The latter is movable in the conveying rail 33 of the circular conveyor 32.

Figure 9:
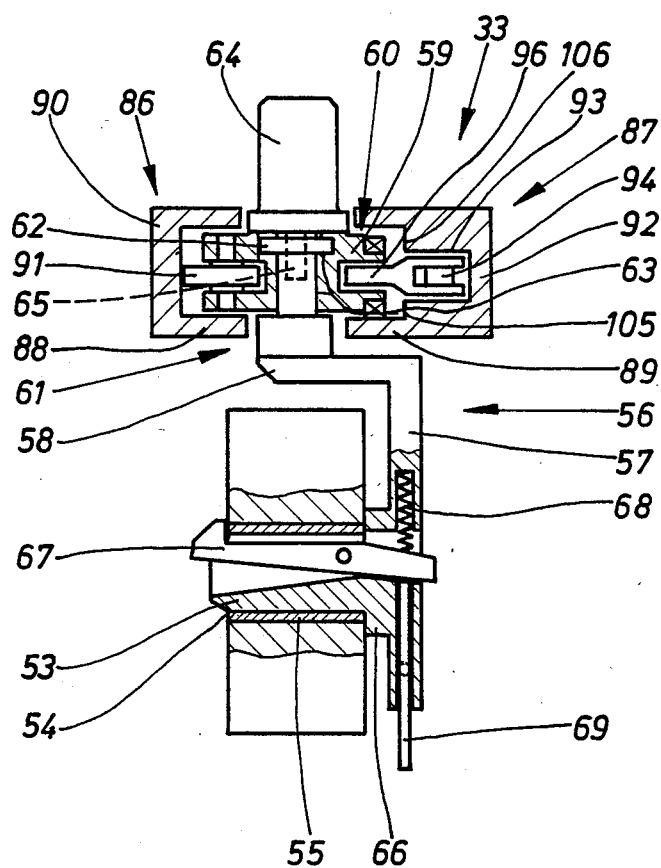
FIG. 9 shows, in detail, a further cross-section through the circular conveyor with a reel carrier.

As shown especially in FIG. 9, the supporting arm 56 or its transverse leg 58 is connected to a pivot pin 61 which is mounted in the undercarriage 59 so as to be rotatable about a vertical axis. As illustrated, the pivot pin 61 is equipped, at the top end, with a widened portion or a collar 62 mounted rotatably in a correspondingly shaped clearance 63 of the undercarriage 59. The collar 62 transmits vertical loads of the reel carrier 34 to the undercarriage 59.

In order to execute rotary movements of the pivot pin 61, attached to the top side of the undercarriage 59 is an electric motor 64, the shaft journal 65 of which engages positively into a depression or bore in the pivot pin 61 and can thus rotate the latter.

By means of the reel carrier 34 designed in this way, in the loading station 36, etc the reels are automatically picked up by the supporting journal 34 which points forwards in the direction of movement and which is moved into the exactly positioned reel or its central orifice 54 as a result of the conveying movement of the reel carriers 34.

The reel rests against an annular stop 66 on the supporting journal 53. By means of an adjustable detent member, the reel is prevented from inadvertently sliding off from the supporting journal 53. In the present case, a two-armed swing hook 67 is mounted in a slit-shaped recess in the supporting journal 53 and, in the detent position, grasps the outer face of the reel or of the hollow core 55. The swing hook 67 is pressed into the locking position by a spring 68. An actuating rod 69 mounted in the leg 57 and projecting from this at the bottom moves the swing hook 67 into a release position as a result of an upward movement, specifically in the region of the particular loading station 36, etc and in the region where the reel is taken off from the supporting journal 53. A movable or fixed actuating member for the actuating rod 69 is installed in each of these regions.

A further special feature is that the reel is taken off from the reel carrier 34 in a similar way in the region of the processing machines, in particular is stripped off from the supporting journal 53. This operation also takes place as a result of the further movement of the reel carriers 34, with the reel being retained at the same time.

For this purpose, the reel carriers, after leaving the loading stations 36, 36a, etc, are rotated through 180° in a rotation station 70, so that the supporting journal 53 hitherto pointing forwards in the direction of transport is now directed rearwards together with the reel. For this purpose, in the rotation station 70, the electric motor 64 is actuated and causes the rotation of the pivot pin 61 and consequently of the supporting arm 56.

An unloading station 71 for extracting the reels from the reel carriers 34 is assigned, as required, to each processing machine (filter-attaching machine 27, film-wrapping machine 25, cigarette packaging machine 24 or extrusion machines 22, 23). The unloading station 71 is located at the height of the circular conveyor 32 or of the path of movement of the reel carriers 34.

Figure 3:
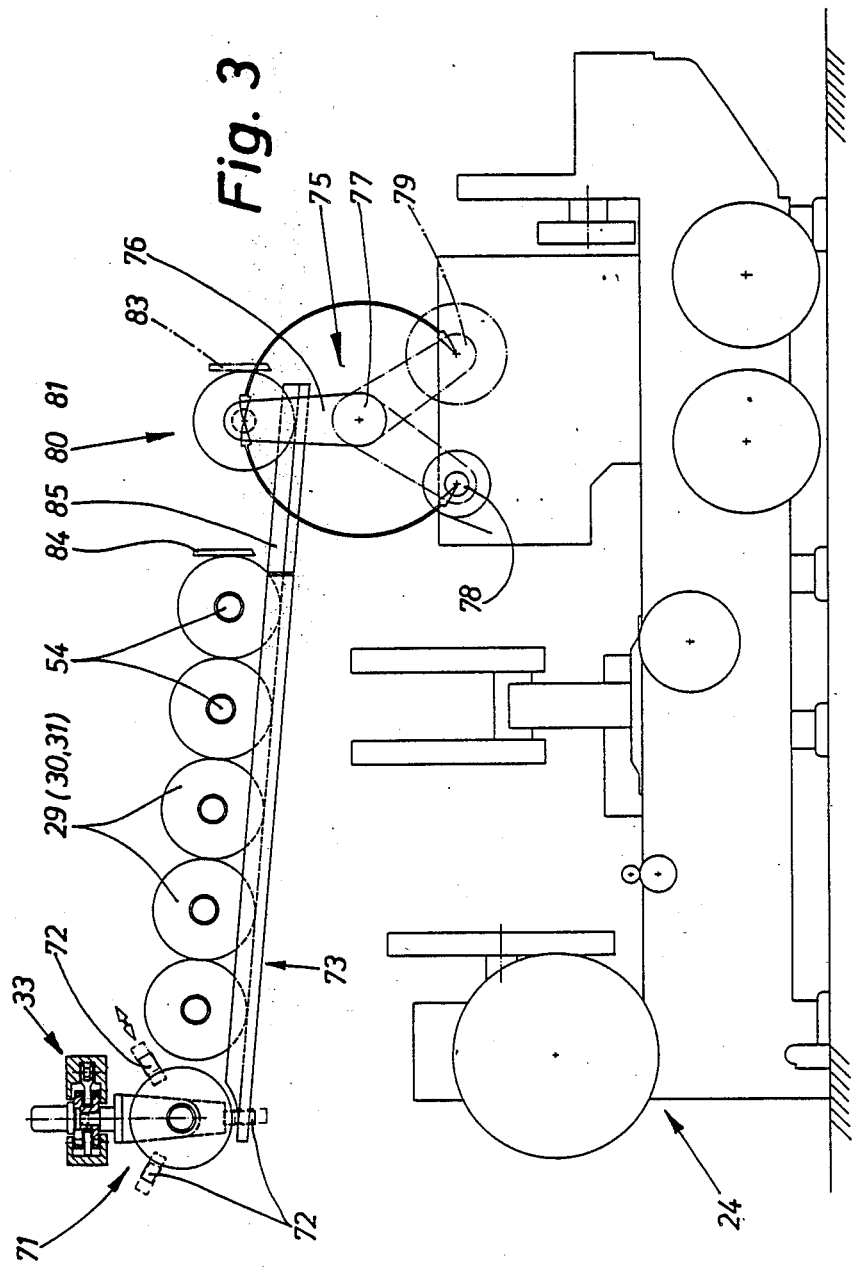
FIG. 3 shows a diagrammatic side view of a packaging machine with devices for feeding reels.

As is evident from FIG. 3, assigned to each unloading station 71 are stripper stops 72 fixed in place, but movable transversely relative to the conveying direction of the reels, in the present case three arranged along the periphery at equal distances from one another. These stripper stops 72 are moved out of a retracted position, in which the reels can be moved freely through the respective unloading station 71, into a stripping position, in which ends of the stripper stops 71 project into the path of movement of the particular reel. When the latter enters the unloading station 71 as a result of the conveying movement of the reel carrier 34, it runs up against the stripper stops 71 and, with the reel carrier 34 being moved further, is retained in the unloading station 71, at the same time being drawn off from the supporting journal 53.

The reels taken off from the reel carrier 34 pass onto the top end of a transfer conveyor 73 directed obliquely downwards. This is of angular cross-section (FIG. 4), with a lateral vertical guide leg 74.

The transfer conveyor 73, which also performs the function of an intermediate store because of its reel holding capacity, conveys the reels directly into a position for these to be taken over by a reel-changing device 75 of a packaging or other processing machine. In the present case, the reel-changing device 75 consists of a transport arm 76 which is pivotable about a bearing 77 alternately in the clockwise direction and in the anti-clockwise direction. As a result of this conveying movement, each time a reel is delivered to one of two reel supporting journals 78 and 79 located on the machine. Either one of the reel supporting journals 78, 79 carries the reel, from which the material to be processed is drawn off onto the processing machine.

For taking over the reel from a take-over position 80, the transport arm 76 is equipped, at its free end, with an axially displaceable reel supporting journal 81. In the upper vertical position of the transport arm 76, this is shifted axially from a restracted initial position into the supporting position and consequently into the central orifice 54 of the reel. The reel is held, in this take-over position 80, on the lower part of the transfer conveyor 73 by means of a stop 82 which is arranged on the side located opposite the transport arm 76.

Together with the reel on the reel supporting journal 81, the transport arm 76 executes a pivoting movement to one or other of the reel supporting journals 78, 79 of the packaging machine. In the transfer position, in which the centrally mounted transport arm 76 is directed obliquely downwards on one side or the other, the reel supporting journal 81 of the transport arm 76 is located in the axial position of one or other of the reel supporting journals 78, 79 of the packaging machine. The latter is shifted in the axial direction towards the transport arm 76, in particular into the central orifice 54 of the reel, the reel supporting journal 81 on the transport arm 76 at the same time being pushed back (bottom of FIG. 4). The reel thereby passes onto the reel supporting journal 78, 79 of the packaging machine without any transverse shift, that is to say without any variation in the transport plane.

The take-over position 80 is determined by a stationary position stop 83 located at the end of the transfer conveyor 73. The remaining reels on the transfer conveyor 73 are fixed at a sufficient distance from the take-over position 80 by means of a movable stopping device 84. The stopping device 84 is retracted whenever a further reel is to be moved into the take-over position 80 (rolls as a result of its own weight).

Figure 4:
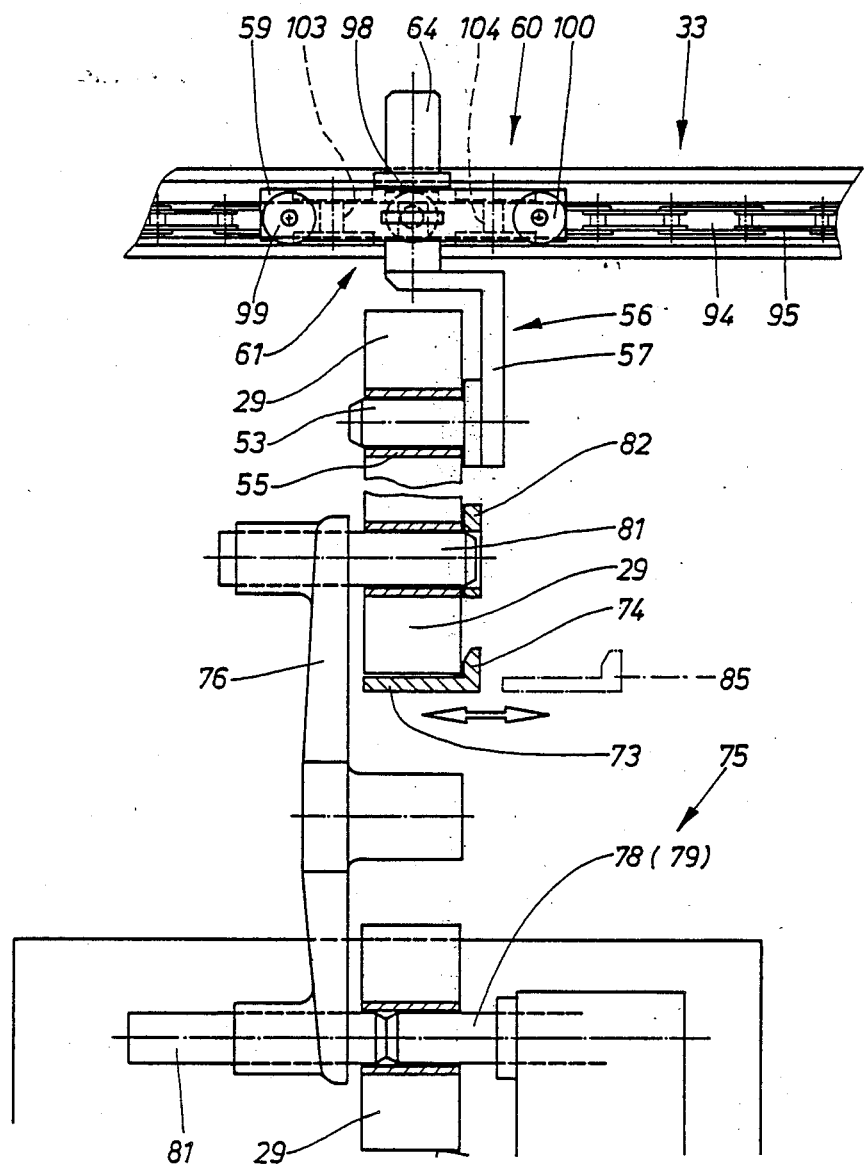
FIG. 4 shows on an enlarged scale, partially in section, an end view, transverse relative to that of FIG. 3, of the upper part of the packaging machine with the devices for feeding reels.
Figure 5:
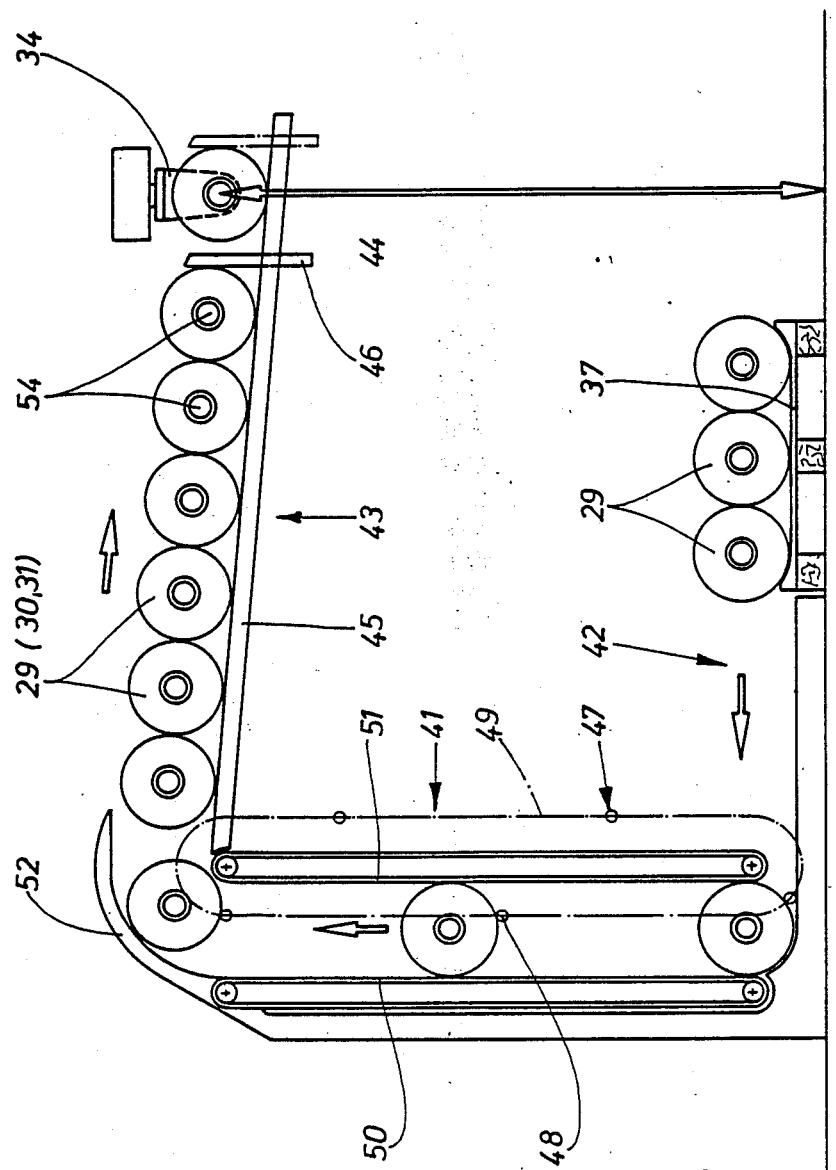
FIG. 5 shows a diagrammatic representation of a loading station for reels with an elevator.
Figure 6:
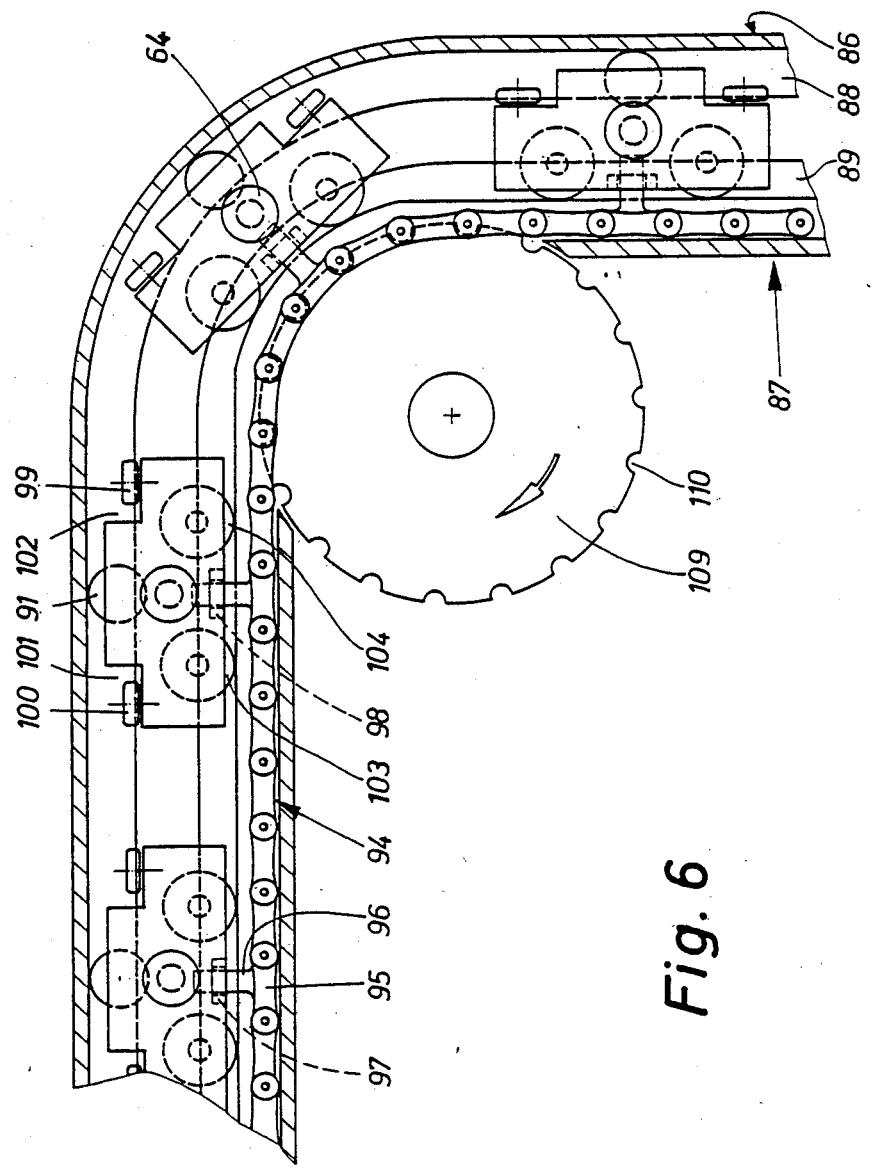
FIG. 6 shows a cut-out of a circular conveyor in a horizontal projection, partially as a horizontal section.
Figure 7:
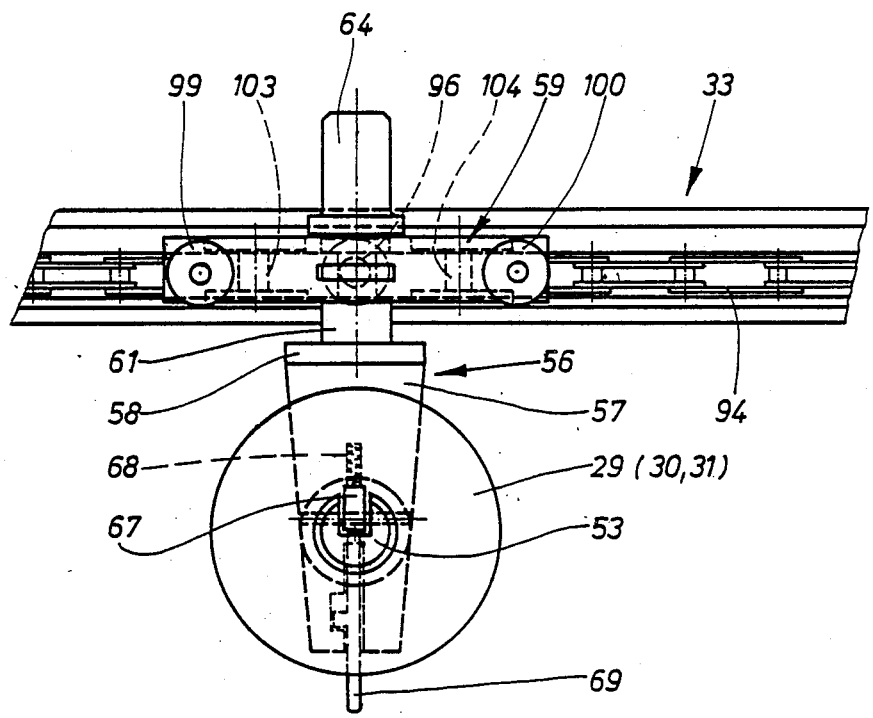
FIG. 7 shows a side view of a portion of the circular conveyor with a reel carrier.

A lower end portion 85 of the transfer conveyor 73 is movable, in particular retractable from the initial or conveying position into the position represented by dot-and-dash lines in FIG. 4. This transverse movement of the lower end portion 85 is necessary when the transport arm 76 is pivoted in the anti-clockwise direction, in order to transport a picked-up reel.

The above-described movements of the end portion 85 of the transfer conveyor 73, the position stop 83 and the stopping device 84 are executed by means of suitable actuating members, especially by means of pressure-medium cylinders which are not shown in detail for the sake of clarity. The reel supporting journals 78, 79 and 81 can also be shifted axially in this way. It is more advantageous, however, to actuate these in accordance with German Patent Application P 3,631,205.3.

The circular conveyor or its conveying rail 33 can be designed in various ways. In the present preferred exemplary embodiment, the conveying rail 33 consists of two essentially C-shaped part rails 86, 87. A lower horizontal rail leg 88, 89 serves as a running track for the bogie 60. A vertical rail web 90 of the first outer part rail 86 serves as a supporting wall for an outer supporting reel 91 rotating about a horizontal axis and belonging to the bogie 60. A vertical rail web 92 of the other inner part rail 87 is provided, when given appropriate dimensions, with a continuous guide slot 93 which extends at a distance from the lower rail leg 89 and which receives a drag chain 94. This is the drive member (subjected to tensile load) for the circular conveyor 32.

The drag chain 94 is designed as a link chain, with chain links pivoting about a vertical axis. Individual chain links 95 are equipped with a transversely directed driving pin 96 connected to a particular bogie 60 or the undercarriage 59. In the present example, the driving pin 96 penetrates into a recess 97 approximately in the centre of the undercarriage 59 and thus makes the driving connection between the latter and the drag chain 94.

The bogie 60 is designed so that on the inside, that is to say in the region of the inner rail leg 89, there is only one central support, in particular by means of a ball bearing 98 which runs on the rail leg 89 and which is arranged concentrically relative to the recess 97 for the driving pin 96. On the outside, that is to say in the region of the outer rail leg 88, the bogie 60 is supported by means of two (front and rear) running wheels 99 and 100 arranged at a distance from one another. These are located in the region of end set-back portions 101 and 102, so that the bogie 60 can travel through even tight bends free of constraint.

Figure 8:
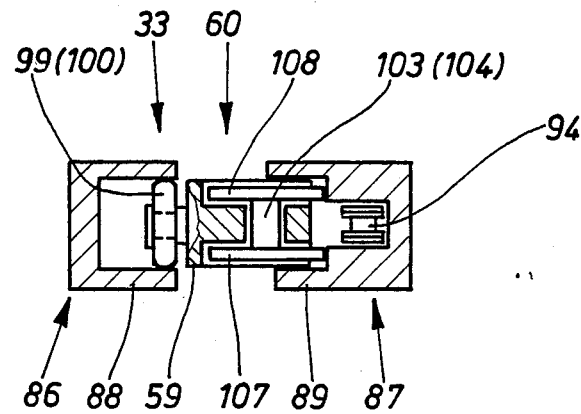
FIG. 8 shows the circular conveyor in cross-section.

The abovementioned supporting wheel 91 is located at mid-height relative to the undercarriage 59 and runs on the outer rail web 90. This supporting wheel 91 is attached approximately in the middle transverse plane of the undercarriage 59. Supporting wheels 103 and 104 are likewise mounted on the inner face at a distance from one another. These bear on lower and upper supporting faces 105 and 106 below and above the guide slot 93. For this purpose, the inner supporting wheels 103 and 104 are designed on the principle of construction of bobbins, that is to say with upper and lower wheel flanges 107 and 108 (FIG. 8).

The drag chain 94 extends on the inside over the entire length of the circular conveyor 32. In the region of the rounded deflection corners there are shaping wheels 109 which have depressions 110 for the positive entry of chain studs of the drag chain 94. One of the shaping wheels 109 is designed and driven as a driving wheel.

Figure 10:
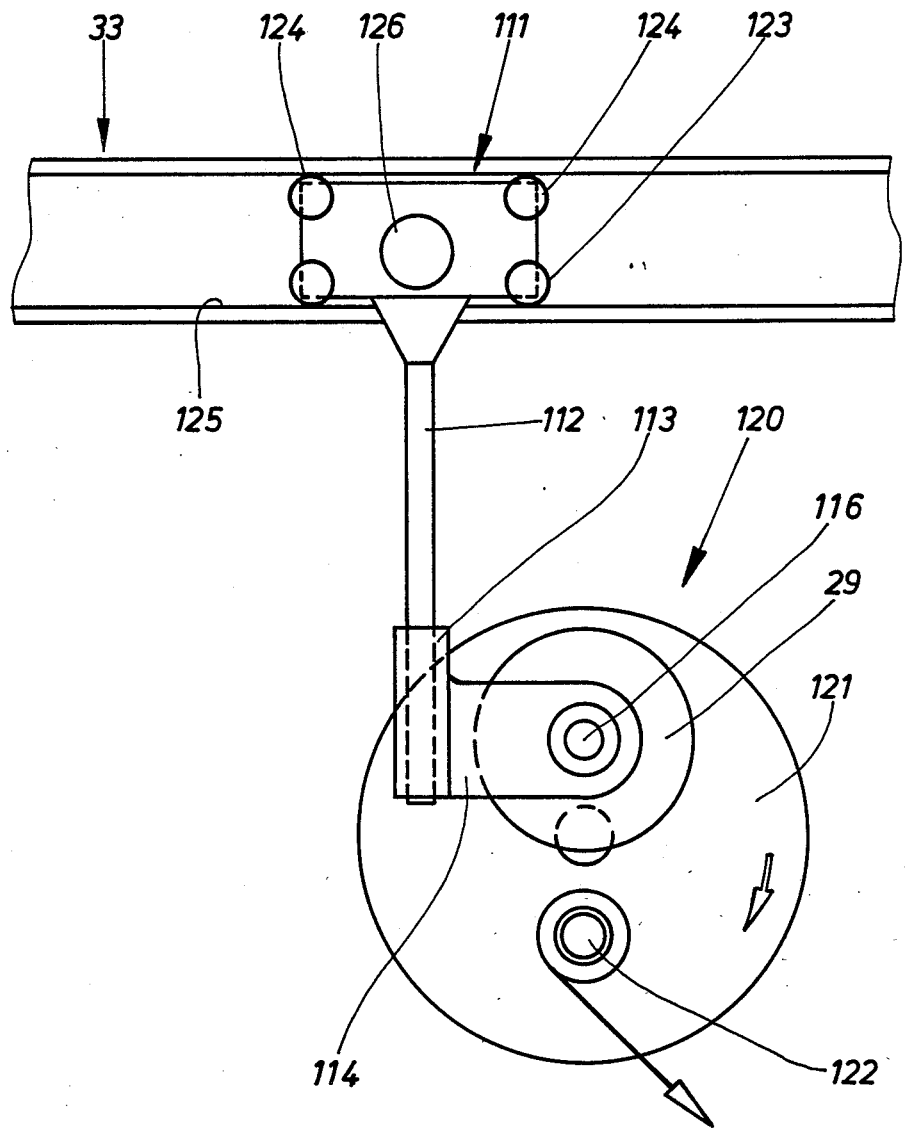
FIG. 10 shows a diagrammatic side view of another exemplary embodiment of a circular conveyor with a reel carrier.
Figure 11:
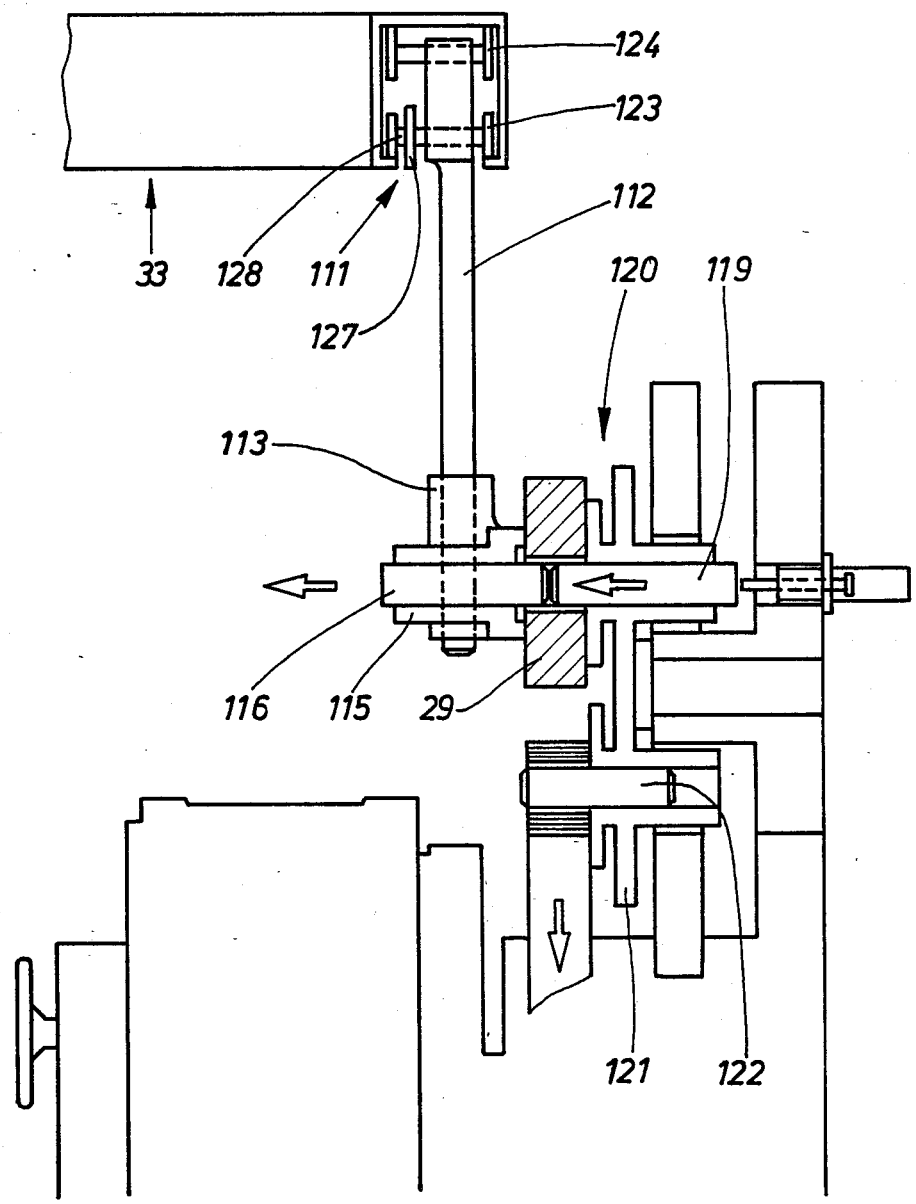
FIG. 11 shows a cross-section relating to the embodiment according to FIG. 10, with an upper part of a packaging machine and a reel-changing device.
Figure 12:
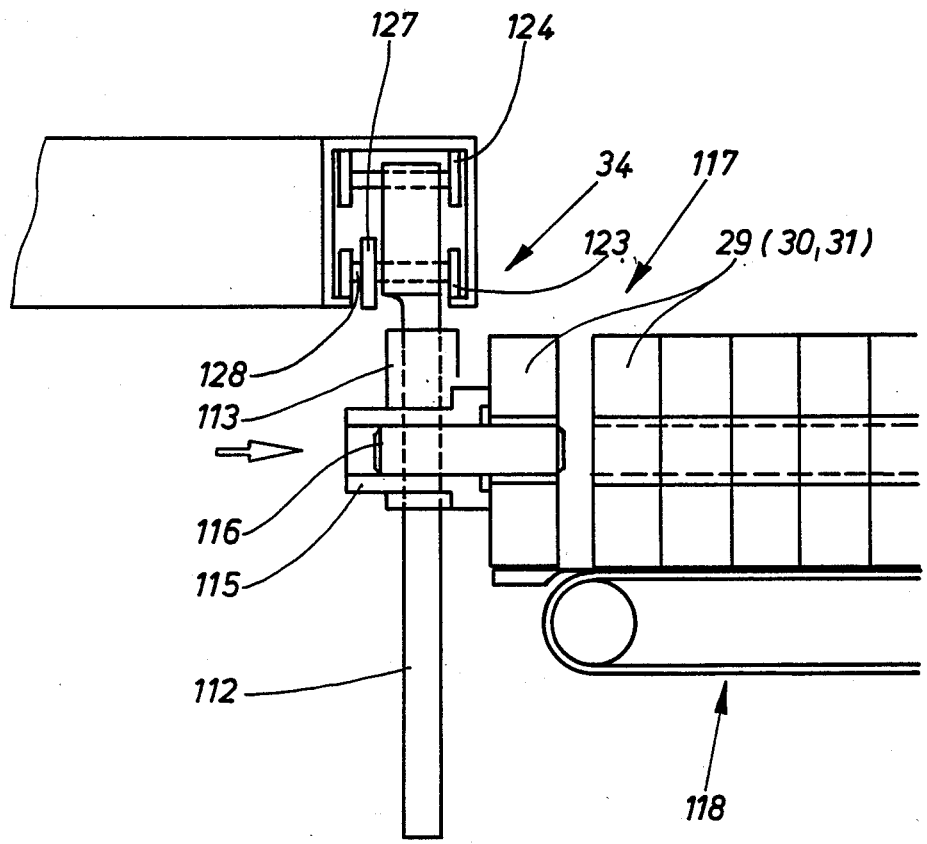
FIG. 12 shows the reel carrier according to FIGS. 10 and 11 during the pick-up of a reel.

An alternative design of the circular conveyor 32 and of the reel carriers 34 is shown in FIGS. 10 to 12. Attached to a bogie 111 is a vertical supporting rod 112 pointing downwards. A guide sleeve 113 is mounted on the latter displaceably, for example by means of a motor drive (motor with rack and pinion not shown in detail). A reel supporting journal 116 rests in a horizontal bearing 115 on a lateral extension 114 of the guide sleeve 113. This reel supporting journal 116 is axially displaceable in the way described.

In the region of the feed station 117, reels are supplied in a coaxial arrangement on a reel conveyor 118. The particular reel located at the front in the direction of movement is picked up by the reel carrier 34, specifically as a result of an axial shift of the reel supporting journal 116 in the way described. At the same time, the reel supporting journal 116 or the guide sleeve 113 of the latter is in an upper position on the supporting rod 112.

By means of the bogie 111, the reel carrier 34 is now conveyed into a position adjacent to a processing machine (FIGS. 10 and 11). Here, the guide sleeve 113 is moved downwards on the supporting rod 112, until the reel supporting journal 116 is axially aligned level with a reel supporting journal 119 of a reel-changing device 120 located on the machine. In the way described, the reel is now transferred onto the reel-changing device 120 as a result of the axial shift of the reel supporting journal 119 on the one hand and of the reel supporting journal 116 on the other hand.

In this embodiment, the reel-changing device 120 is designed so that two particular reels are located above one another. These reels or their reel supporting journals 119, 122 are moved into the (lower) working position by means of a common supporting member 121.

The bogie 111 of this reel carrier 34 is equipped with four lower running rollers 123 and four upper guide rollers 124. These run in a channel-shaped conveying rail 125 open only at the bottom. Here, the bogies 111 are driven by means of a drive motor 126 which is assigned to each bogie and which acts, via a pinion 127, on a shaft 128 connecting two running rollers 123 to one another.

In this exemplary embodiment, the feed station 117 can be arranged in a similar way to the loading stations of the exemplary embodiment according to FIGS. 1 to 9.

In the operation to supply reels to the production or packaging plant, pallets 37 containing the particular reels in sufficient quantity are advanced to the loading stations 36, 36a, 36b, etc of the loading zone 35 by means of the fork-lift trucks 40. So that no bottlenecks arise, at least two loading stations are provided for each type of reel. The reel carriers 34, as a result of their shape, especially dimensions, are designed for a specific type of reel. Empty reel carriers 34 are equipped with the appropriate reel in the region of the loading zone 35.

Subsequently, the reel carriers 34 are rotated through 180° in the region of the rotation station 70. As required, in the further course of the conveying movement, reels are taken off from the reel carriers in the way described. The emptied reels are returned to the initial position in the region of a reverse rotation station 129, in particular with the supporting journal 53 pointing forwards. Insofar as a reel carrier 34 has not been emptied during the course of a revolution, it remains in the conveying position (with the supporting journal 53 pointing rearwards) and is returned to a circuit without a loading operation.

Figure 13:
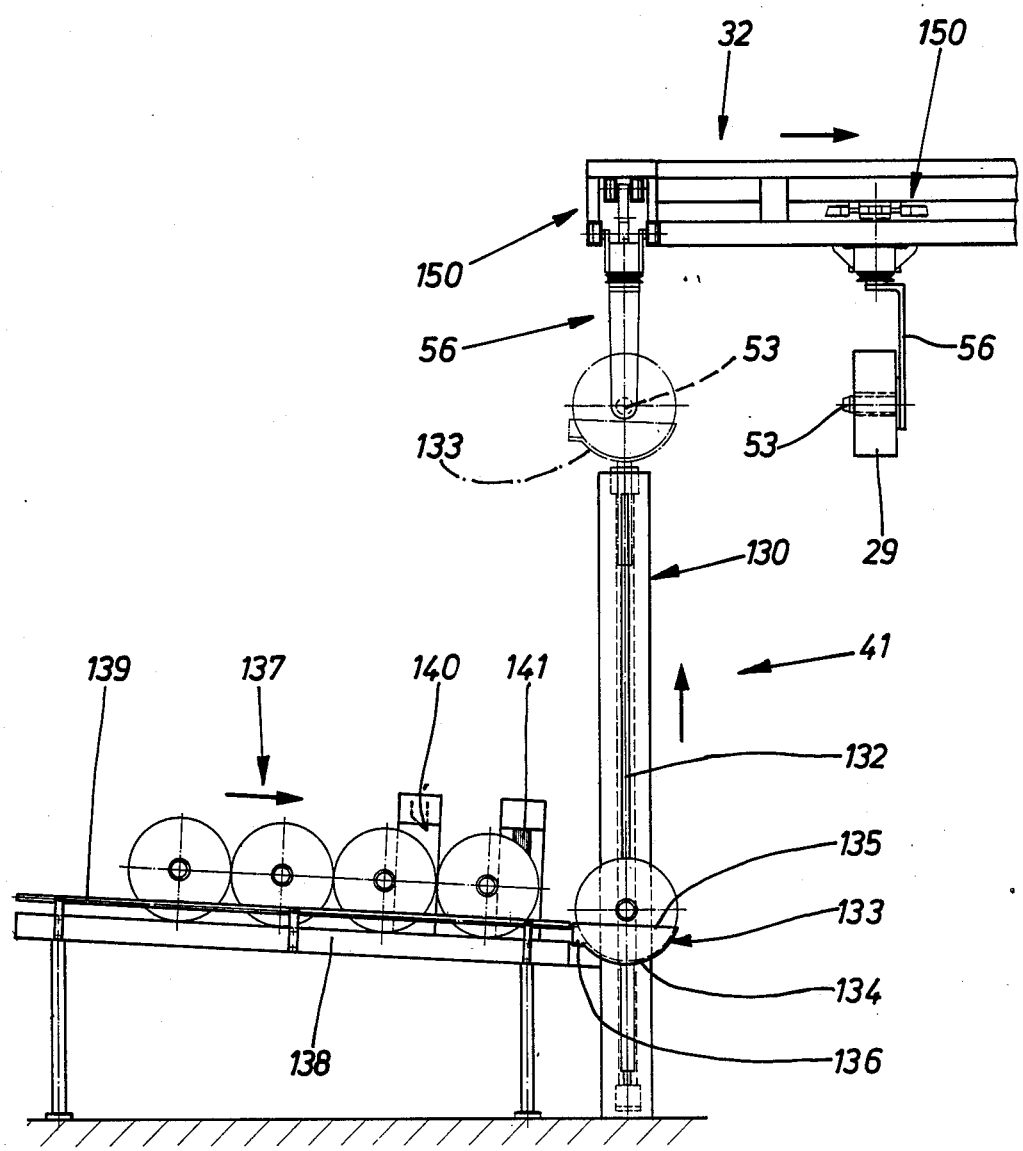
FIG. 13 shows a diagrammatic side view of an alternative design of a reel-loading station, FIG. 14 likewise shows a side view of a further alternative design of a reel-loading station.

An alternative design of the loading stations 36, 36a, 36b, etc is shown in a diagrammatic side view in FIG. 13. The circular conveyor 32 has assigned to it a special conventional elevator 41. This is a vertical pneumatic conveyor 130 which consists of an elongate vertical cylinder 131 without a piston rod (ORIGA pneumatic cylinder). A piston is movable pneumatically up and down in the cylinder 131 and is connected, via a lateral continuous vertical slit 132 and a connection piece running in this, to a receptacle arranged outside the cylinder 131 and intended for a reel 29, 30, 31. The receptacle, which, in the present exemplary embodiment, is designed as a supporting dish 133 in the form of a part circle, as seen in a side view, accordingly extends laterally next to the cylinder 131. The reel 29, 30, 31 aligned in a vertical plane rests on a bottom wall 134, in the form of an arc of a circle, of the supporting dish. On the side facing away from the cylinder 131, the supporting dish 133 is equipped with a side wall 135, whereas on the opposite side it is open. Connected to one transverse side of the supporting dish 133 is a run-in piece, in particular a bridge 136 directed obliquely downwards. A particular reel can roll into the supporting dish 133 automatically via this, so that the supporting dish 133 can be loaded without any attendance.

At the top end of the pneumatic conveyor 130, the supporting dish 133 assumes a position above the cylinder 131. As a result, the reel can be discharged automatically, in its axial direction, from the supporting dish 133 in the way described, by being taken up by a reel carrier 34, in particular via the open side of the supporting dish 133. The dimensions of the pneumatic conveyor 130 are such that, in the upper end position, the reel is aligned exactly with the conveying track of the reel carrier 34 or of the supporting journal 53.

Loading takes place automatically. For this purpose, a ground-level store 137 fixed in place on the ground and intended for a number of reels 29, etc is assigned to a pneumatic conveyor 130. The ground-level store 137 acts at the same time as a ground-level feed conveyor for the reels as a result of a bearing plane for the vertically arranged reels which descends obliquely to the pneumatic conveyor 130.

In the exemplary embodiment of FIG. 13, the ground-level store 137 is designed as a roller conveyor 138 conveying obliquely downwards, with lateral guide rods 139 for the reels. In the lower receiving position of the supporting dish 133, the bridge 136 is adjacent to the lower end of the roller conveyor 138 as a continuation of the latter, so that the reels can run into the supporting dish 133 without a step.

For the successive transfer of the reels to the pneumatic conveyor 130, only one reel is released at any particular time. For this purpose, a stopping means with two stopping devices 140 and 141 movable up and down and each assigned to a reel is arranged above the roller conveyor 138. After the reel has been received by the supporting dish 133, the stopping device 141 is moved into the lower position. As a result, the following reels can run on the roller conveyor 138 up against this stopping device 141 adjacent to the pneumatic conveyor 130. When the next reel is to be released for transfer to the supporting dish 133, the stopping device 140 is lowered in order to fix the further reels. The stopping device 141 is now retracted, so that the front reel or that adjacent to the pneumatic conveyor 130 is released. In this design of the ground-level store 137, the reels can be placed on the roller conveyor 138 by hand.

Figure 14:
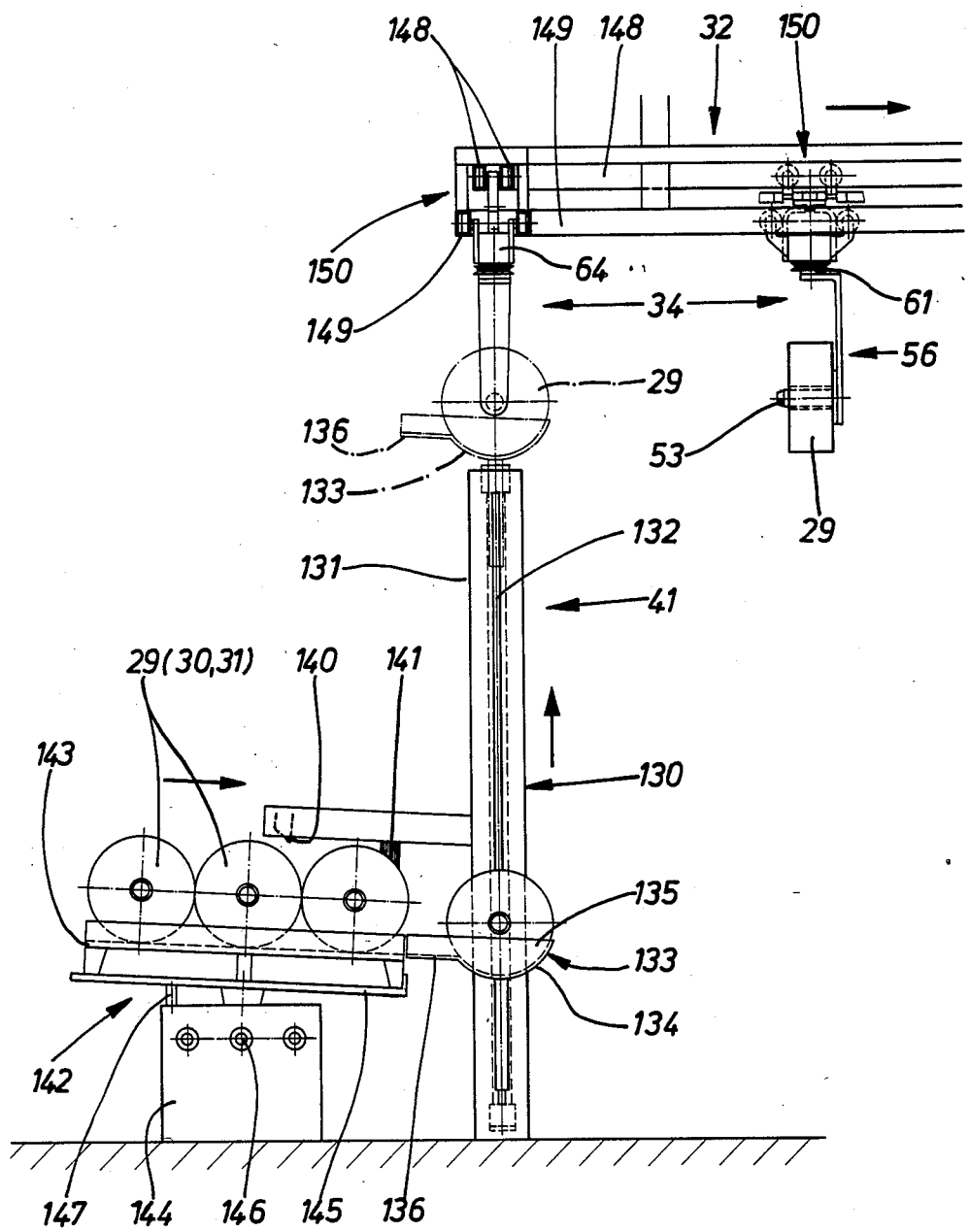

In the exemplary embodiment of FIG. 14, the ground-level store 137 is an appropriately designed pallet 142. On this, the reels are arranged upright in a vertical plane on a pallet base 143. At least on the side assigned to the pneumatic conveyor 130, the pallet 142 is made without a lateral limitation, that is to say without a side edge, so that, here, the reels can roll off freely from the pallet 142 or the pallet base 143, specifically over the bridge 136 into the supporting dish 133.

For this purpose, the pallet 142 is placed on a supporting device whih tilts the pallet 142 into an inclination descending to the pneumatic conveyor 130 and which, at the same time, aligns it with the pneumatic conveyor 130 or the supporting dish 133 as a result of a transverse shift. The device consists, here, of a supporting pedestal 144 and a table 145, on which the pallet 142 is mounted. The table 145 is supported on the supporting pedestal 144 and is pivotable about a bearing 146. At a distance from this, a lifting pin 147 projects from the supporting pedestal 144. This lifting pin 147 is moved up against the underside of the table 145, as a result of which the latter is tilted into a sloping position.

A stopping means with the stopping devices 140 and 141 in the design already described is assigned to the pallet 142.

In the embodiment described above, the circular conveyor 32 is designed in a different way from the preceding ones, in particular with two pairs of running rails 148 and 149 arranged above one another and with a bogie 150 adapted to these. This design of the circular conveyor 32 is known in principle. The reel carrier 34 designed in a special way and rotatable about a vertical axis is attached to the bogie 150.

We claim:
1. Apparatus for transporting reels of packing material, from a stock to at least one processing machine, comprising
   at least one loading station for loading reels onto a carrying means;
   at least one unloading station for unloading said reels from said carrying means;
   at least one circular conveyor arranged above said at least one processing machine and provided with a plurality of said carrying means for carrying said reels of packing material in a carrying direction;
   each of said carrying means being provided with an horizontally extending supporting journal for introducing a freely accessible end thereof into a central orifice of a reel during a loading procedure in said loading station and for supporting a loaded reel during carrying of said reel;
   bearing means for rotatably supporting said supporting journal about a vertical axis; motor means carried by said carring means for rotating said supporting journal about said vertical axis, and comprising means for controlling the rotational position of said supporting journal and for rotating said supporting journal in a direction in which said end of said supporting journal points to a direction opposite to said carrying direction when said carrying means approaches said unloading station; and strip-off means, provided in said unloading station, for contacting said reels, and for stripping said reel off from said supporting journal.

2. Apparatus according to claim 1 in which said circular conveyor is provided with means for constantly rotating said conveyor, and wherein said means for controlling the rotational position of said supporting journal rotates said supporting journal into a pick-up position for automatically picking up said reel during a continuous movement.

3. Apparatus according to claim 1 wherein said means for controlling the rotational position of said supporting journal rotates said supporting journal into a rotating position in which said end of said supporting journal points into said conveying direction during picking up of said reel.

4. Apparatus according to claim 1 in which said carrying means is provided with a supporting arm for mounting said supporting journal to said bearing means.

5. Apparatus according to claim 1 in which each said circular conveyor comprises a conveying rail, a bogie, movable in said conveying rail, and an undercarriage attached to said bogie by said bearing means.

6. Apparatus according to claim 5 in which said bearing means comprises a vertical pivot pin and an axial bearing comprising a collar for centrally mounting said supporting journal with respect to said undercarriage.

7. Apparatus according to claim 1 in which said motor means comprises an electric motor arranged on the top side of said carrying means.

8. Apparatus according to claim 4 in which said supporting arm comprises a vertical leg which is offset relative to the axis of rotation and to which the supporting journal is attached so as to project from one side thereof for carrying a reel centrally relative to the vertical axis of rotation.

9. Apparatus according to claim 1 in which said supporting journal comprises a releasable locking member for fixing the reel on said supporting journal, said locking member having the shape of a swing hook for entering said central orifice and for being moved out of engagement with the reel during loading and unloading thereof.

10. Apparatus according to claim 5 in which said bogie comprises three running wheels for supporting said bogie on said conveying rail, a first one of said running wheels being arranged on the inner face of the bogie and approximately in the middle transverse plane, and the remaining two said running wheels being arranged at a distance from one another at a front end and at a rear end, respectively, of said bogie and opposite to said first running wheel.

11. Apparatus according to claim 10 in which said circular conveyor comprises a common pulling member comprising an endless rotating drag chain guided in a lateral guide slot extending approximately at midheight and provided in an inner part of said conveying rail for moving said bogie; and in which said drag chain comprises cross-connection means comprising a transversely projecting driving pin projecting into a recess of said undercarriage concentrically to said first wheel for connecting said bogie to said drag chain.

12. Apparatus according to claim 5 in which said bogie comprises supporting wheels mounted rotatably about a vertical axis for supporting said bogie on side faces of said conveying rail wherein said supporting wheels comprise a single central supporting wheel, supportable on an outer face of said conveying rail, and two supporting rollers, arranged at a distance from one another and supportable on an inner face of the conveying rail, the inner supporting rollers being designed like bogies and comprising upper and lower wheel flanges.

13. Apparatus according to claim 1 in which said strip-off means comprises stripper stops which are movably mounted for being inserted into a path of movement of the reels.

14. Apparatus according to claim 1 in which a transfer conveyor is provided for transferring reels from said unloading station to a reel-changing device provided in said processing machine.

15. Apparatus according to claim 14 in which said transfer conveyor comprises a track inclined downwards in direction to said reel-changing device.

16. Apparatus according to claim 14 in which said reel-changing device comprises a further reel supporting journal mounted to a transport arm and being shiftable in an axial direction thereof so as to be introduced into the central orifice of the reel.

17. Apparatus according to claim 1, provided with an elevator comprising a constantly rotating endless rod conveyor for transporting reels to said loading station.

18. Apparatus according to claim 17 wherein the elevator (41) is followed by an intermediate conveyor (43), in the form of a conveying track (45) directed obliquely downwards, on which the reels positioned in a vertical plane are delivered by rolling to a take-over point (44) formed at the lower end of the intermediate conveyor (43) and adapted for the take-over of a reel by a reel carrier (34).

19. Apparatus according to claim 18 the reels are mounted in a vertical position on a pallet (142) as a ground-level store, and the pallet (142), by being inclined, is movable into a conveying position for the automatic rolling delivery of reels to the elevator (41).

20. Apparatus according to claim 19, wherein the pallet (142) is adapted to be placed on a supporting pedestal (144) or on a table (145) of the latter, the table (145) being movable into an inclined position by means of tilting members (bearing 146, lifting pin 147).

21. Apparatus according to claim 1 in which said supporting journals are designed so as to pick up different types of reels and in which separate loading stations are provided for loading different types of reels.

22. Apparatus according to claim 17 in which said loading station is provided with a ground-level store assigned to said elevator for receiving a plurality of reels to be transferred to said elevator, the ground-level store comprising a conveyor having a rolling plane inclined in direction to said elevator for rolling said reels to said elevator.

23. Apparatus according to claim 22 in which said elevator is provided with a receptacle comprising a circular carrying dish matching the shape of the reel, and wherein an inclined bridge is provided for rolling said reel to said circular carrying dish.

* * * * *